(12) United States Patent
Pfeffer

(10) Patent No.: US 6,555,489 B1
(45) Date of Patent: Apr. 29, 2003

(54) FILTER COMPOSITE EMBODYING GLASS FIBER AND SYNTHETIC RESIN FIBER

(75) Inventor: Jack R. Pfeffer, Eagle, ID (US)

(73) Assignee: Consolidated Fiberglass Products Company, Bakersfield, CA (US)

( * ) Notice: Subject to any disclaimer, the term of this patent is extended or adjusted under 35 U.S.C. 154(b) by 218 days.

(21) Appl. No.: 09/597,080

(22) Filed: Jun. 20, 2000

(51) Int. Cl.[7] .............................. B32B 5/26; B32B 5/28
(52) U.S. Cl. ...................... 442/390; 428/362; 428/368; 428/398; 55/527; 210/493.1; 210/497.01; 442/331; 442/333; 442/338; 442/352; 442/355; 442/381
(58) Field of Search ................................ 428/362, 364, 428/398; 55/527; 210/493.1, 497.01; 442/333, 331, 338, 352, 355, 381, 390

(56) References Cited

U.S. PATENT DOCUMENTS

| | | | |
|---|---|---|---|
| 3,690,852 A | 9/1972 | Smith et al. | 427/201 |
| 5,389,121 A | 2/1995 | Pfeffer | 55/487 |
| 5,472,467 A | 12/1995 | Pfeffer | 55/488 |
| 5,630,856 A | 5/1997 | Pfeffer | 55/488 |
| 5,985,411 A | 11/1999 | Pfeffer | 428/152 |

Primary Examiner—Terrel Morris
Assistant Examiner—John J. Guarriello
(74) Attorney, Agent, or Firm—William W. Haefliger

(57) ABSTRACT

A filter composite comprises a first layer of glass fibers having random orientation, and synthetic resinous fibers extending in close association with the glass fibers, the glass fibers having:

i) diameters between 1 and 16 microns
  ii) lengths between about ¼ and 1½ inches the synthetic fibers having denier between 1.6 and 40, and length between ¼ and 2 inches.

16 Claims, 1 Drawing Sheet

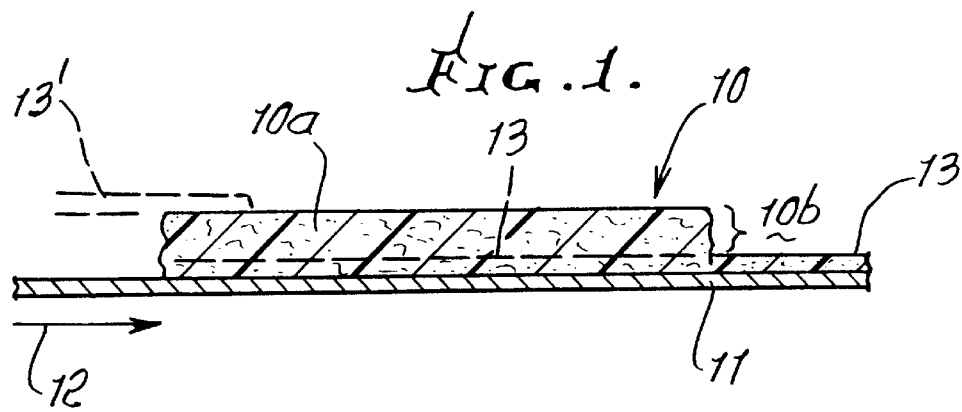
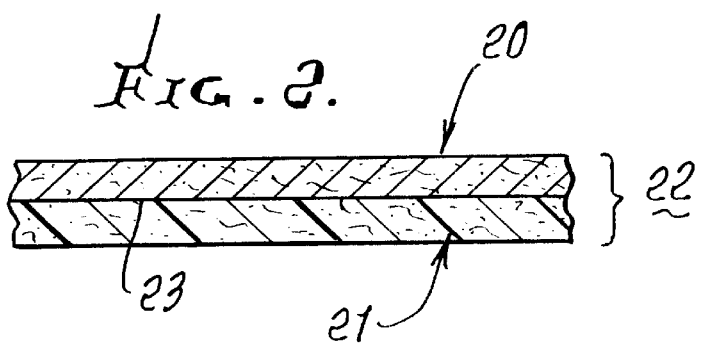
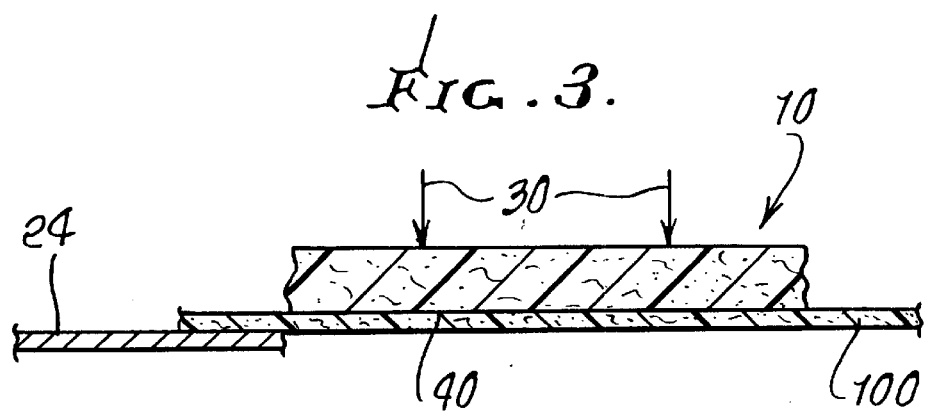
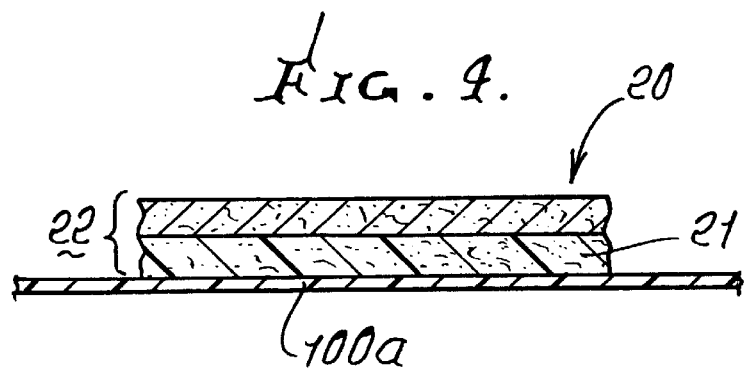

FILTER COMPOSITE EMBODYING GLASS FIBER AND SYNTHETIC RESIN FIBER

BACKGROUND OF THE INVENTION

This invention relates generally to forming of fiber composites, for example as are used in air filtration; and more particularly, the invention concerns provision of a filter composite comprising multiple layers of porous materials, of such characteristics as enable the composite to be self-supporting, i.e., without need for wire backing or other auxiliary support adjacent areal extents of the composite. Such wireless composites are of great advantage, as respects ease of manufacture, use in filtering, and ease of disposal. Wire-supported filters require wire trimming, producing sharp edges which can and do injure hands of workers manufacturing filters.

There is need for longer-life filters capable of efficiently filtering particulate from gas streams, and there is need for efficient, effective methods of producing such filters. There is also need for preventing escape of smaller diameter fibers from filter structures.

The disclosures of U.S. Pat. Nos. 3,690,852 and 5,985,411 are incorporated herein, by reference.

SUMMARY OF THE INVENTION

It is a major object of the invention to provide an improvement filter composites meeting the above needs. That composite basically comprises a) a first layer of glass fibers having random orientation, and
  b) synthetic resinous fibers extending in close association with the glass fibers.

As will be seen, the synthetic resinous fibers may be distributed in mixed relation with the glass fibers of the first layer; or the synthetic resinous fibers may extend in a layer separate from but adjacent to the first layer glass fibers. Both such modes of synthetic fiber disposition may be employed in a filter composite employing glass fibers. Typically, the synthetic resinous fibers may comprise between 10% and 60% by volume of the total composite volume of both glass and synthetic resin fibers. The synthetic resinous fibers may typically consist of polyester resin.

Another object is to provide an additional porous layer which blocks escape of fibers, to consist essentially of non-woven, synthetic fiber, examples being CEREX, non-woven NYLON or RAYON. The latter is provided as an air-laid, NYLON, or RAYON non-woven layer. That additional layer is typically bonded to the glass fiber layer during the manufacturing process.

A further object includes provision of bonding resin adherent to the fibers in such layers, the filter composite being porous. The to bonding resin typically is applied to saturate the described layer or layers, excess resin being removed, as by vacuum application to the composite, whereby porosity of the composite is maintained or provided.

Yet another object is to provide a composite having synthetic resinous fibers with crimped or hollow shapes, and straight shafts, and wherein the bulk of the glass fibers have:

i) diameters between 1 and 16 microns
  ii) lengths between ¼ and 1½ inches.

The filter composite typically has weight between 0.01 and 0.05 lbs, per square foot; and thickness between 0.02 and 0.10 inches.

A yet further object includes:

a) providing a first layer of glass fibers having random orientation,
  b) providing an additional layer of non-woven NYLON or RAYON fibers extending adjacent that first layer,
  c) and providing and adhering bonding resin to fibers in such layers, and then removing sufficient of the bonding resin to establish filter porosity, for allowing gas flow through the filter.

As will be seen, the bonding resin consists essentially of thermoplastic resin adapted to be heated during reforming of the filter to selected shape. The filter typically assumes selected shape after heating, reforming, and cooling of the resin; and one advantageous shape comprises folds or pleats, as may be chosen by the user following filter material manufacture and sale.

These and other objects and advantages of the invention, as well as the details of an illustrative embodiment, will be more fully understood from the following specification and drawings, in which:

DRAWING DESCRIPTION

FIGS. 1–4 are sections taken through filter composites embodying the invention, and are preferred.

DETAILED DESCRIPTION

In FIG. 1 a first porous layer 10 of glass fibers (of random orientation) is formed or provided. The fibers may be deposited onto a porous conveyor belt 11 traveling lengthwise as indicated by arrow 12. Layer 10 may include a non-woven glass fiber porous, mat 13 transported by the conveyor belt, and the glass fibers may be deposited as a sub-layer 10b on the mat 13. Mat 13 may alternatively be deposited on top of layer 10, as indicated by broken lines 13'. Synthetic resin fibers are substantially uniformly and homogeneously mixed in, or dispersed into the glass fibers in the sub-layer 10b, thereby building up its thickness for enhanced collection and particle entrapment during use as a filter. The synthetic fibers may for example consist of polyester resin, or other man-made fibers such as NYLON and/or RAYON and others, and preferably have bulky form, as produced by crimping of the synthetic resin fibers before they are mixed in with the glass fiber. Alternatively, the synthetic fibers may be hollow to increase their bulk. The overall thickness t of layer 10 of glass fibers thereby is substantially enhanced for improved filtering of particulate.

The synthetic fibers in the mix may have various diameters, i.e. denier between 1.6 and 40, and they preferably provide volumetrically between about 10% and 60% of the overall volume of the layer 10. The fibers have at least one of the following shapes i) crimped
  ii) hollow
  iii) straight shafts
  iv) solid shafts The length of the bulk of the synthetic fiber lie between 0.25 and 2.0 inches. The overall thickness t of a fiber is typically between 0.010 and 0.100 inches.

The bulk of the glass fibers in layer 10b typically have filament diameters between 1 and 16 microns, and lengths between 0.25 and 1.50 inches. The filter composite has weight between 0.01 and 0.05 lbs per square foot.

FIG. 2 shows a glass fiber layer 20 like layer 10 of FIG. 1, except that the synthetic resinous fibers extend in a separate porous layer 21 adjacent or attached by adhesive bonding, to one side of layer 20 instead of being mixed in or distributed within layer 20. The objective of increasing the thickness of the overall composite 22 without increasing the filter weight per unit area is still attained. The synthetic resinous and glass fibers themselves have the same physical characteristics as referred to above. The thickness of synthetic fiber layer 21 is such that volumetrically the synthetic fiber constitute between 10% and 60% of the volume of the overall composite of layers 20 and 21, per unit area of the composite.

FIG. 3 is like FIG. 1, (synthetic fibers mixed into glass fibers) except that a thin flexible layer 100 of porous material (as for example NYLON or RAYON, or other man-made fibers) is attached, as by porous adhesive bonding, as at 40 to one side of the composite layer 10, for containing (preventing pass-through escape of) very small diameter fibers in 10. Layer 100 has a surface weight of between 0.4 and 0.5 oz. per square yard, its thickness being between 0.001 and 0.005 inch. The NYLON, and/or RAYON layer 100 may be supported by a porous belt 24 during formation of the composite. Fiber layer 10, containing synthetic fiber as described, is progressively deposited on the layer 100 during endwise travel of belt 24. The layer 100 may be substantially thinner than the layer 10. The FIG. 3 filter composite is a preferred form of the invention.

FIG. 4 is like FIG. 2, except that layer 100a of porous material (as for example CEREX, or non-woven NYLON or RAYON) is attached, as by porous adhesive bonding, to one side of the composite 22. Layer 100a functions and has the characteristics of layer 100 as described above, in regards to FIG. 3. Composite 22 includes glass fiber layer 20 and synthetic fiber layer 21.

In each of FIGS. 2, 3 and 4 above bonding resin may be applied, as by fluid curtain coating application to the composite, to saturate and bind the multiple layers together. Excess resin is removed as by vacuum application to the composite, as it progressively moves with a supporting porous belt, through vacuum application apparatus. The composite then passes through an oven, for drying and curing of the product. Subsequently, the composite is removed from the belt, and cut to size and rolled up into jumbo rolls. The bonding resin advantageously consists of a water resistant thermoplastic resin.

The filter composite in its variously described forms has sufficient thickness to be resiliently and yieldably bendable during gas flow impingement on said composite, at gas flow velocity between 35 and 2000 ft$^3$ per minute.

The method of forming a filter media composite typically includes the steps:

a) providing a first layer of glass fibers having random orientation, b) providing an additional layer of synthetic resinous fibers extending adjacent said first layer, c) and providing and adhering bonding resin to fibers in said layers, and then removing sufficient of the bonding resin to establish filter porosity, for allowing gas flow through the filter.

The bonding resin typically consists of thermoplastic resin and the method may also include reforming the media composite to selected shape and heating the reformed media composite to cause the composite to maintain said selected shape.

The bonding resin may for certain purposes consist of thermosetting resin, as where resin softening during reforming is not required, or where reforming is not required.

I claim:

1. A filter composite comprising a) a first layer of glass fibers having random orientation, and b) synthetic resinous fibers extending in a second layer adjacent to said first layer of glass fibers, said second layer consisting essentially of said resinous fibers, the composite including an additional layer of non woven NYLON or RAYON fiber, c) said glass fibers having:
      i) diameters between 1 and 16 microns
      ii) lengths between about ¼ and 1½ inches d) said synthetic fibers having denier between 1.6 and 40, and length between ¼ and 2 inches, e) there being bonding resin adherent to the fibers in said layers, and wherein said resin was provided by saturation followed by application of a vacuum to remove some resin and thereby establish porosity, f) the composite overall thickness being between 0.010 and 0.100 inches.

2. The composite of claim 1 wherein said synthetic resinous fibers are distributed in a homogeneous mix with said first layer glass fibers.

3. The composite of claim 2 wherein said synthetic resinous fibers together comprise between 10 and 60% by volume of the total composite volume.

4. The composite of claim 1 wherein said synthetic resinous fibers together comprise between 10 and 60% by volume of the total composite volume.

5. The composite of claim 1 wherein said synthetic resinous fibers consist of polyester resin.

6. The composite of claim 1 wherein said synthetic resinous fibers have one or more of the following shapes:
   i) crimped
   ii) hollow
   iii) straight shafts
   iv) solid shafts.

7. The composite of claim 1 wherein the filter composite has weight between 0.01 and 0.05 lbs, per square foot.

8. The composite of claim 1 wherein the filter composite has sufficient thickness to be self supporting during gas flow impingement on said composite, at gas flow velocity between 35 and 2,000 feet$^3$ per minute.

9. A filter composite comprising in combination a) a first layer of glass fibers having random orientation, and b) synthetic resinous fibers extending in a second layer adjacent to said first layer of glass fibers, said second layer consisting essentially of said resinous fibers, c) said glass fibers having:
      i) diameters between 1 and 16 microns
      ii) lengths between about ¼ and 1½ inches d) said synthetic fibers having denier between 1.6 and 40, and length between ¾ and 2 inches, e) there being bonding resin adherent to the fibers in said layers, said layers having sufficient porosity for filtering, f) the composite overall thickness being between 0.010 and 0.100 inches.

10. The composite of claim 9 wherein said synthetic resinous fibers consist of polyester resin.

11. The composite of claim 9 wherein said synthetic resinous fibers have one of the following shapes:

i) crimped
ii) hollow
iii) straight shafts
iv) solid shafts.

12. The composite of claim 9 wherein the filter composite has weight between 0.01 and 0.05 lbs per square foot.

13. The composite of claim 9 wherein the filter composite has sufficient thickness to be self supporting during gas flow impingement on said composite at gas flow velocity between 35 and 2,000 feet$^3$ per minute.

14. The composite of claim 9 wherein the bonding resin consists essentially of thermoplastic resin adapted to be heated during reforming of the filter to selected shape.

15. The composite of claim 14 wherein the filter has been reformed to selected shape, said selected shape including pleats.

16. The composite of claim 9 wherein the resin is thermosetting.

* * * * *